April 6, 1943.   F. S. DENNEEN ET AL   2,315,509
APPARATUS FOR HEAT TREATING
Original Filed Sept. 30, 1937   2 Sheets-Sheet 1

INVENTORS.
Francis S. Denneen and
William C. Dunn
BY Fay, Macklin, Gobrick and Williams
ATTORNEYS

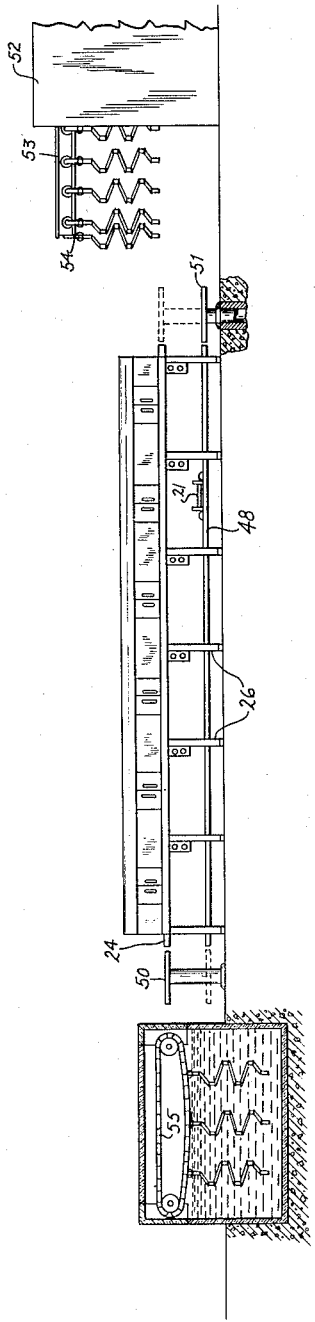

Patented Apr. 6, 1943

2,315,509

UNITED STATES PATENT OFFICE 2,315,509

APPARATUS FOR HEAT TREATING

Francis S. Denneen, Cleveland, and William C. Dunn, Shaker Heights, Ohio, assignors to The Ohio Crankshaft Company, Cleveland, Ohio, a corporation of Ohio Original application September 30, 1937, Serial No. 166,648. Divided and this application March 18, 1941, Serial No. 383,966

7 Claims. (Cl. 219—13)

This application is a division of our co-pending case Serial No. 166,648, filed September 30, 1937. The invention relates to apparatus for heat treating, by induction, the surface zones of metallic articles as, for instance, crankshafts. The general object of the invention has been to provide an apparatus by which a piece to be hardened may be handled with great facility in an apparatus for the purpose. Another object has been to provide such a mechanism which will be simple in operation and will permit the operator to insert pieces to be treated and remove them from the machine.

With these and other objects in view which will appear as the following description proceeds, said invention then consists of the apparatus illustrated in the annexed drawings and herein described. The phraseology employed is for the purpose of explanation and not for limitation and the claims hereto appended point out those parts of the invention which are regarded as novel.

In said annexed drawings:

Fig. 3 is a diagrammatic front elevation, partly in section of Fig. 1.

Figure 2:
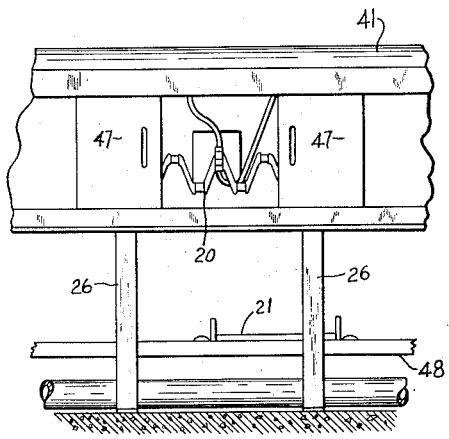
Fig. 2 is a fragmentary front elevation of a part of said heating and quenching mechanism substantially as indicated by the line 2—2 in Fig. 1.

Referring now to the drawings it will be noted that the general arrangement of the apparatus is illustrated as applied to the heat treatment of a crankshaft shown at 20 although numerous other shafts and similar articles may be treated thereby. In this embodiment the carrier 21, having V block supports 22 for the shaft, is carried on wheels 23 which run on tracks 24 and 25.

These tracks are supported on a series of frames or supports 26 having such brackets as 27 attached thereto for holding a transformer 28, hereinafter designated as a focus inductor. This focus inductor is carried by a trunnion support 29 in the frame 30 of a carriage 31. The focus inductor supports a pair of hollow inductor blocks 34 and 35 which are provided with orifices (not shown) in the article adjacent faces thereof so that a fluid supplied to the inductor blocks is sprayed out of these orifices against the article. This carriage 31 is provided with four wheels 32 constrained to follow track members 33.

By means of the trunnion 29 and the wheels 32 the focus inductor is provided with a mounting which permits it to be moved forward to bring the article adjacent faces of inductor blocks into correct transverse position relative to a shaft carried by the V-block support 22. Likewise it may be inclined to meet substantially any elevation of this shaft or any part of the shaft, such as a crank pin, when the V blocks support the main bearings. It also permits the lower block 35 to be lowered sufficiently to be brought under a pin or bearing to be hardened. To facilitate the manual operation of this focus inductor, a changeable counterweight 36 is provided which balances the focus inductor and which is made changeable so as to balance the focus inductor when the latter is equipped with inductor blocks of different size and weight.

Water for cooling the coils of the focus inductor is provided by flexible hose lines 37 and 38. Quenching fluid, is supplied directly to inductors 34 and 35 by hose lines 39 and 40. As there is considerable excess quenching fluid which flows out of the inductors, a large part would be thrown onto the surrounding mechanism including parts of the focus inductor, damaging this mechanism as well as being lost or wasted. To prevent this damage and loss, an enclosure 41 usually in the form of a tunnel extending past several heater stations at each of which a focus inductor is located, is provided.

A flexible boot or bellows shaped shield 42 extends from the focus inductor to the tunnel and surrounds the extending parts of the inductors. This shield 42 is sufficiently flexible to permit of the necessary above described movement of the focus inductor. A collector pan 43, forming a part of the support stand 26, serves as means for accumulating the spent quenching fluid. Pipe 44 collects the quench from the several pans and returns it to the supply reservoir. A pressure pump, not shown, circulates the quenching fluid through pipe 45 to the lines 39 and 40 at relatively high pressures so as to cause the quench to be delivered through the orifices of the inductors to accomplish the desired rapid quenching of these surfaces with sufficient pressure to dislodge and/or prevent incipient steam pockets or vesicles of vapors on the heated surfaces. For convenient accessibility in placing inductor blocks 34 and 35 in position over the article to be hardened, the tunnel 41 is provided with a pair of doors 47 opposite each heat treating station or focus inductor.

As the shaft to be hardened advances through the tunnel 41 on carrier 21, it is stopped at each station which is equipped with a set of inductors of suitable width and diameter to harden some selected surface of the shaft so that each station hardens a different portion of the shaft.

After passing the last station at the end of the tunnel, the shaft is removed from the carrier 21 and this carrier is returned to the opposite end of the tunnel where another shaft to be hardened is placed upon it. In order to bring the carrier back to the starting end of the tunnel, return tracks 48 and 49 are provided in the lower part of the tunnel supporting frames 26, which tracks are spaced substantially the same as tracks 24 and 25 above. A suitable conveyor is employed to return the carriers along these lower tracks.

As the carriers 21 have considerable weight, especially when loaded, means is provided for raising and lowering them between the levels of the two sets of tracks. This means comprises the two elevating platforms 50 and 51, one at each end of the tunnel, as shown in Fig. 3, and each of which is fluid operated, usually by compressed air. In some cases the shaft to be hardened is preheated and is delivered to platform 51 from preheater 52 which is equipped with a track 53 having suitable roller carriers 54. Upon removing the shaft from the carrier after this carrier has reached platform 50 the shaft is attached to a suitable conveyor such as is indicated at 55 and is caused to pass through a reheating chamber.

Figure 1:
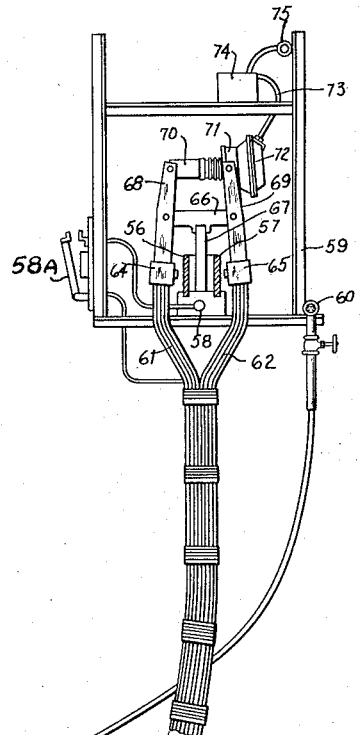
Fig. 1 is a side elevation, partly in section of a heating and quenching mechanism having incorporated therein the principal features of this invention.
Figure 1:
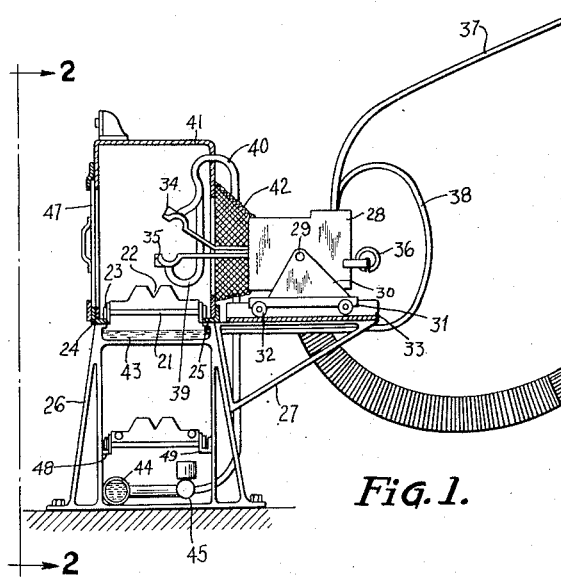

For the purpose of supplying heating energy to the various stations along the tunnel 41, a system of bus bars such as 56, 57 and 58, shown in the upper part of Fig. 1, is provided. Bus bar 58 and switch 58A are employed to connect the source of current to an intermediate coil of the primary of the focus inductor to provide an auto transformer effect and thus to increase voltage between bus bars 56 and 57 which are connected to the outer coils of the focus inductor. These bus bars are usually supported by insulating means on a metal carrier frame 59 which also supports supply headers 60 for cooling water lines 37 and also various relays, air supply lines and other parts which are conveniently located thereon.

For conducting the high frequency current, usually employed, from the bus bars to the focus inductors, two groups of cables 61 and 62, held in close parallel relationship to reduce harmful inductance are employed. As it is desired to have the focus inductor connected to the bus bars only during such periods as heating is required, means are provided for readily connecting and disconnecting terminals 64 and 65 of the cables to the bus bars 56 and 57. Such means, shown in detail in the parent application, comprise a bracket 66 supported on an insulating spacer 67 which is carried between the bus bars 56 and 57. Hingedly mounted on bracket 66 are two pairs of arms 68 and 69 to the lower ends of which contactor blocks 64 and 65 are connected respectively. To the upper end of arms are connected the two relatively moveable members 70 and 71 of an air operated chamber 72. Compressed air is supplied to this chamber through hose line 73 from relay operated valve 74. Air is supplied to valve 74 by supply header 75. The contactors 64 and 65 serve as terminals for the groups of cables 61 and 62. These contactors are rectangular blocks of copper having a series of holes in which the exposed metal of the cables 61 and 62 is suitably secured.

It will be seen from the foregoing description that we have provided mechanism for acting on material subject to heat treatment and that our invention reduces to a minimum the manual operations required and at the same time accomplishes the objects above set out.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In apparatus of the character described, the combination of a base, a housing for an article to be heated mounted upon said base, a horizontal guideway supported by said base, a carriage movable on said guideway, a transformer pivotally carried by said carriage, said housing having an opening therein, an inductor member carried by said transformer and projecting through the opening in said housing and a flexible shield connecting said housing and said transformer means and covering said opening.

2. In apparatus of the character described, a base, means for supporting an article to be heated, a track on said base for the article supporting means, a source of high frequency current, an inductor adapted to be moved into spaced relation with the article to be heated, means for supporting the inductor, a track on the base carrying the inductor supporting means, the said track being disposed to guide the said inductor in a direction substantially at right angles to the track for the aforesaid article supporting means to permit the inductor to be moved into spaced relation with successive parts of the article when the article on its supporting means is moved to selected positions along its track and means for supplying periodically varying current to the inductor.

3. In apparatus for independently heating selected parts of an article, a series of supporting members, an enclosure substantially in the form of a tunnel being carried by said members, a multiplicity of heating stations being spaced along the enclosure, a track in the enclosure, a car being adapted to move along the track and to carry the article from station to station in the enclosure, a heater being at each of said heating stations, each heater being formed to heat one of the selected parts of the article, each heater being carried by a car, the car being carried by a bracket, associated with the aforesaid enclosure, the said last named car being shiftable on said bracket transversely of the track within the enclosure to move a part of the heater thru a wall of the enclosure and into heating relation with a selected part of the article, and means for supplying energy to the heater.

4. In apparatus for independently heating selected parts of an article, a series of supporting members, an enclosure substantially in the form of a tunnel being carried by said members, a multiplicity of heating stations being spaced along the enclosure, a track in the enclosure, a car being adapted to move along the track and to carry the article from station to station in the enclosure, a heater being at each of said heating stations, each heater being formed to heat one of the selected parts of the article, each heater being carried by a car, the car being carried by a part of one of the aforesaid enclosure supporting members, the heater carrying car being shiftable transversely of the track in the enclosure, the two said cars in combination comprising a substantially universal adjustment for locating the heater relative to the selected part of the article, and flexible means for delivering energy to the heater.

5. In apparatus for heating selected parts of an article, supporting members, an enclosure substantially in the form of a tunnel being carried by said members, a multiplicity of heating stations being spaced along the enclosure, a track in the enclosure, a car being adapted to move along the track and to carry the article from station to station in the enclosure, a heater being at each of said heating stations, the heater comprising a transformer and an inductor, the inductor being formed to lie in closely spaced relation with one of the selected parts of the article, each heater being carried by a car and being pivotally mounted on said car, the last named car being carried by a member associated with the aforesaid enclosure, the heater carrying car being shiftable transversely of the track in the enclosure to bring the inductor into alignment with the selected part of the article, the pivotally mounted inductor permitting the inductor to be moved substantially at right angles to the direction of the transverse movement of the car to bring said inductor into desired spaced relation with the said part of the article, and means to deliver periodically varying current to said heater while the inductor is in heating position relative to the part of the article.

6. In apparatus for independently heating selected parts of an article, supporting members, an enclosure substantially in the form of a tunnel being carried by said members, a plurality of heating stations being spaced along the enclosure, a track in the enclosure, a car being adapted to move along the track and to carry the article from station to station in the enclosure, a heater being at each of said heating stations each heater being formed to heat one of the selected parts of the article, each heater being supported by a car, means associated with the aforesaid enclosure for carrying the heater supporting car, the said last named car being shiftable transversely of the track within the enclosure to move a part of the heater thru a wall of the enclosure and into heating relation with a selected part of the article, and means for supplying energy to the heater.

7. In apparatus for independently heating selected parts of an article, supporting members, an enclosure substantially in the form of a tunnel being carried by said members, a plurality of heating stations being spaced along the enclosure, a track in the enclosure, a car being adapted to move along the track and to carry the article from station to station in the enclosure, a heater being at each of said heating stations, each heater being formed to heat one of the selected parts of the article, supporting means for each heater, means associated with the aforesaid enclosure for carrying the heater supporting means, the said last named means being shiftable transversely of the track within the enclosure to move a part of the heater thru a wall of the enclosure and into heating relation with a selected part of the article, and means for supplying energy to the heater.

FRANCIS S. DENNEEN.
WILLIAM C. DUNN.